US012617638B2

(12) United States Patent
Inoue

(10) Patent No.: US 12,617,638 B2
(45) Date of Patent: May 5, 2026

(54) SHEET FEEDING DEVICE AND IMAGE FORMING APPARATUS

(71) Applicant: KYOCERA Document Solutions Inc., Osaka (JP)

(72) Inventor: Toshiaki Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/009,322

(22) Filed: Jan. 3, 2025

(65) Prior Publication Data

US 2025/0230004 A1 Jul. 17, 2025

(30) Foreign Application Priority Data

Jan. 12, 2024 (JP) ................................. 2024-003109

(51) Int. Cl.
| | |
|---|---|
| *B65H 1/14* | (2006.01) |
| *B65H 1/04* | (2006.01) |
| *B65H 3/06* | (2006.01) |
| *B65H 7/04* | (2006.01) |
| *B65H 7/14* | (2006.01) |
| *G01D 5/347* | (2006.01) |
| *G03G 15/00* | (2006.01) |

(52) U.S. Cl.
CPC ................. *B65H 1/14* (2013.01); *B65H 1/04* (2013.01); *B65H 3/0607* (2013.01); *B65H 7/04* (2013.01); *B65H 7/14* (2013.01); *G01D 5/3473* (2013.01); *G03G 15/50* (2013.01); *G03G 15/553* (2013.01); *G03G 15/6511* (2013.01); *B65H 2301/42324* (2013.01); *B65H 2301/54* (2013.01); *B65H 2402/31* (2013.01);

*B65H 2553/41* (2013.01); *B65H 2553/51* (2013.01); *B65H 2557/33* (2013.01); *B65H 2801/06* (2013.01)

(58) Field of Classification Search
CPC .......... B65H 1/14; B65H 1/04; B65H 3/0607; B65H 7/04; B65H 7/14; B65H 2301/42324; B65H 2301/54; B65H 2402/31; B65H 2553/41; B65H 2553/51; B65H 2557/33; B65H 2801/06; G03G 15/50; G03G 15/553; G03G 15/6511; G01D 5/3473
See application file for complete search history.

(56) References Cited

U.S. PATENT DOCUMENTS

| | | | |
|---|---|---|---|
| 2007/0172296 A1* | 7/2007 | Igarashi | ............... B41J 13/0027 400/625 |
| 2012/0104688 A1* | 5/2012 | Blair | ........................ B65H 1/14 271/167 |

(Continued)

FOREIGN PATENT DOCUMENTS

JP 2001-302018 A 10/2001

*Primary Examiner* — David H Banh
(74) *Attorney, Agent, or Firm* — Stein IP, LLC

(57) ABSTRACT

A sheet feeding device includes a lift plate, a feeding portion, a lifting member lifting the lift plate, a motor coupled to a pivot shaft serving as the pivot fulcrum of the lifting member, a control portion, and an encoder outputting a pulse signal according to the rotation of the pivot shaft. The encoder includes a rotary member and an optical sensor. The control portion recognizes the remaining quantity of sheets on the lift plate based on the count value of the pulse signal. When the motor stops being driven, the control portion thereafter does not count the pulse signal until a predetermined period elapses.

5 Claims, 10 Drawing Sheets

(56) References Cited

U.S. PATENT DOCUMENTS

| 2016/0101955 | A1* | 4/2016 | Koseki | H04N 1/00477 |
| | | | | 271/265.01 |
| 2020/0024091 | A1* | 1/2020 | Alagos | B65H 1/266 |

* cited by examiner

LIGHT

SHEET FEEDING DEVICE AND IMAGE FORMING APPARATUS

INCORPORATION BY REFERENCE

This application is based on and claims the benefit of priority from Japanese Patent Application No. 2024-003109 filed on Jan. 12, 2024, the contents of which are hereby incorporated by reference.

BACKGROUND

The present disclosure relates to a sheet feeding device and an image forming apparatus.

Conventional sheet feeding devices feed a sheet stored in a storage portion by pulling the sheet out from the storage portion. In the conventional sheet feeding device, sheets are set on a lift plate. When one sensor detects that the sheets on the lift plate are at an upper limit position and another sensor detects that the lift plate is at a lower limit position, the remaining quantity of sheets is considered to be 100%. Based on the ascending time of the lift plate from that time point, the remaining quantity of sheets is found.

SUMMARY

According to a first aspect of the present disclosure, a sheet feeding device includes a lift plate, a feeding portion, a lifting member, a motor, a control portion, and an encoder. The lift plate has sheets set on it. The feeding portion contacts the sheet on the lift plate from above to pull and feed the sheet out from the lift plate. The lifting member is disposed under the lift plate, lifts the lift plate by making one end of the lifting member in the feeding direction pivot upward about the other end of the lifting member in the feeding direction serving as a pivot fulcrum, and thereby brings the sheet on the lift plate into contact with the feeding portion. The motor is coupled to a pivot shaft serving as the pivot fulcrum of the lifting member, rotates the pivot shaft and thereby makes the one end of the lifting member pivot upward. The control portion controls the motor and stops driving the motor when the sheet on the lift plate contacts the feeding portion. The encoder outputs a pulse signal according to rotation of the pivot shaft. The encoder includes a rotary member and an optical sensor. The rotary member has a plurality of sensing targets arranged at intervals from each other in the circumferential direction of the pivot shaft, and rotates together with the pivot shaft. The optical sensor has a light emitter and a light receiver disposed so as to face each other across the movement path of the plurality of sensing targets and changes the level of the pulse signal between when the light from the light emitter reaches the light receiver and when it does not. The control portion recognizes the remaining quantity of sheets on the lift plate based on the count value of the pulse signal. When the motor stops being driven, the control portion does not count the pulse signal after the motor stops being driven until a predetermined period elapses.

According to a second aspect of the present disclosure, an image forming apparatus includes the sheet feeding device described above and prints an image on a sheet fed from the sheet feeding device.

BRIEF DESCRIPTION OF THE DRAWINGS

FIG. 2 is a schematic diagram showing an image forming portion according to the embodiment.

FIG. 9 is a diagram showing the relationship between the driving stop time point of a lift motor (the time point of a level change from H to L) and a predetermined period according to the embodiment.

DETAILED DESCRIPTION

Now, an embodiment of the present disclosure will be described taking as an example a tandem color laser printer. The present disclosure finds applications in not only printers but also multifunction peripherals having copying and other functions. Moreover, the present disclosure finds applications in not only color machines but also monochrome machines.

Figure 1:
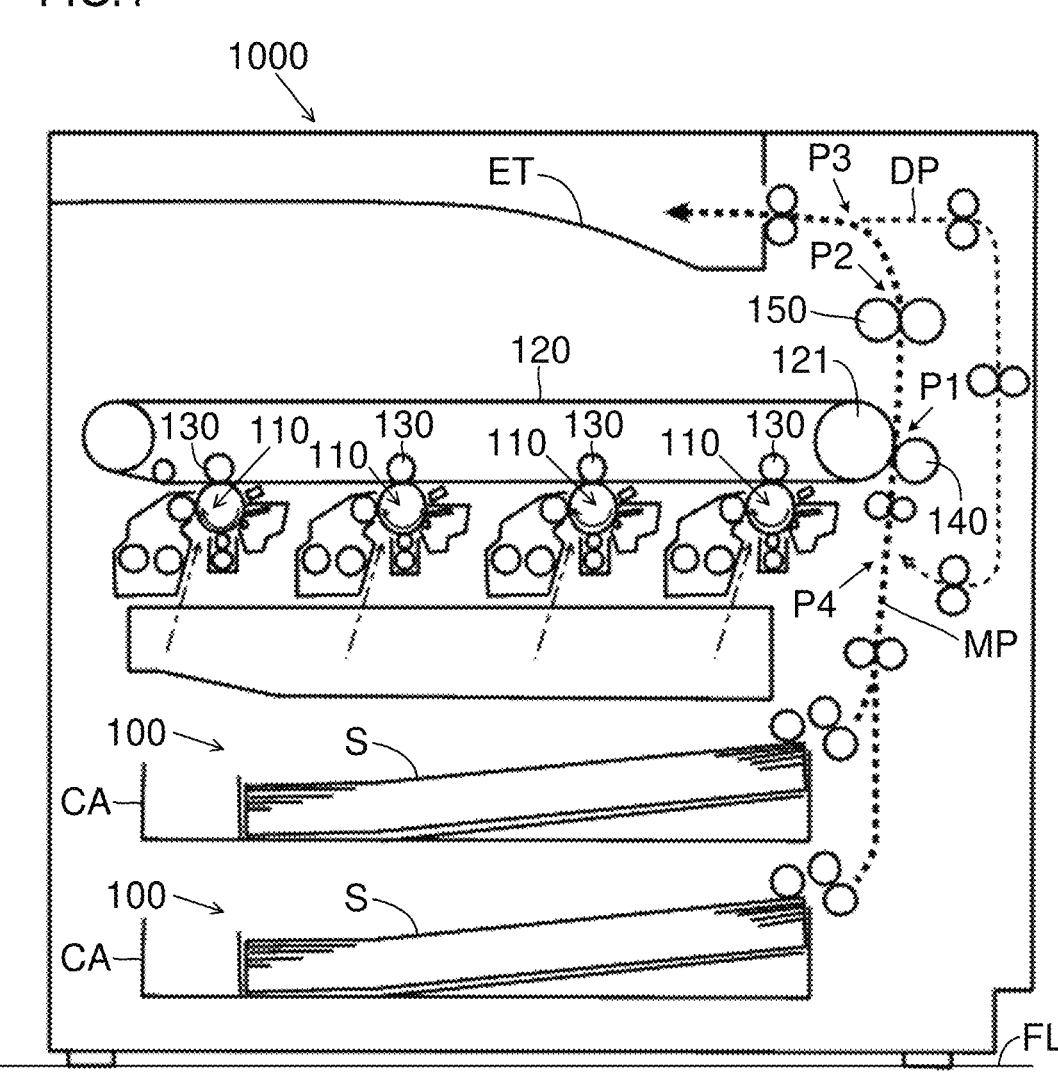
FIG. 1 is a schematic diagram showing an image forming apparatus according to an embodiment.

Construction of the Image Forming Apparatus: FIG. 1 shows a construction of an image forming apparatus 1000 according to the embodiment. The image forming apparatus 1000 is installed on a flat floor surface FL. The image forming apparatus 1000 has, as its top-bottom directions, directions perpendicular to the floor surface FL.

The image forming apparatus 1000 includes a main conveyance passage MP (indicated by a bold broken arrow). The main conveyance passage MP reaches an ejection tray ET via a transfer position P1 and a fixing position P2.

In a printing job, a sheet S is fed to the main conveyance passage MP and is conveyed along the main conveyance passage MP; an image with toner is formed; and the image is then printed on the sheet S being conveyed. In other words, at the transfer position P1, the transferring of the image to the sheet S being conveyed is performed. At the fixing position P2, the fixing of the image to the sheet S is performed.

The image forming apparatus 1000 includes a pair of conveyance rollers (no reference sign assigned). The pair of conveyance rollers has a pair of rollers kept in pressed contact with each other. The pair of conveyance rollers has a conveyance nip between the rollers. The pair of conveyance rollers, by rotating, conveys the sheet S having reached the conveyance nip. In other words, the pair of conveyance rollers nips the sheet S between the rollers and, by rotating in this state, conveys the sheet S. The pair of conveyance rollers is disposed in the main conveyance passage MP and conveys the sheet S along the main conveyance passage MP. The pair of conveyance rollers is also disposed in a duplex printing conveyance passage DP, which will be described later (indicated by a fine broken arrow), and conveys the sheet S along the duplex printing conveyance passage DP.

The image forming apparatus 1000 includes a sheet feeding device 100. The sheet feeding device 100 feeds the sheet S to the main conveyance passage MP. The configuration of the sheet feeding device 100 will be described in detail later.

The image forming apparatus 1000 includes an image forming portion 110. Four image forming portions 110 are provided. The four image forming portions 110 correspond to the colors of cyan, magenta, yellow, and black respectively. The four image forming portions 110 each form an image with toner of the corresponding color. Now, with a focus on one image forming portion 110 its configuration will be described. The four image forming portions 110 have the same configuration, and thus no description will be given of the configuration of the other image forming portions 110, for which the following description can be referred to.

Figure 2:
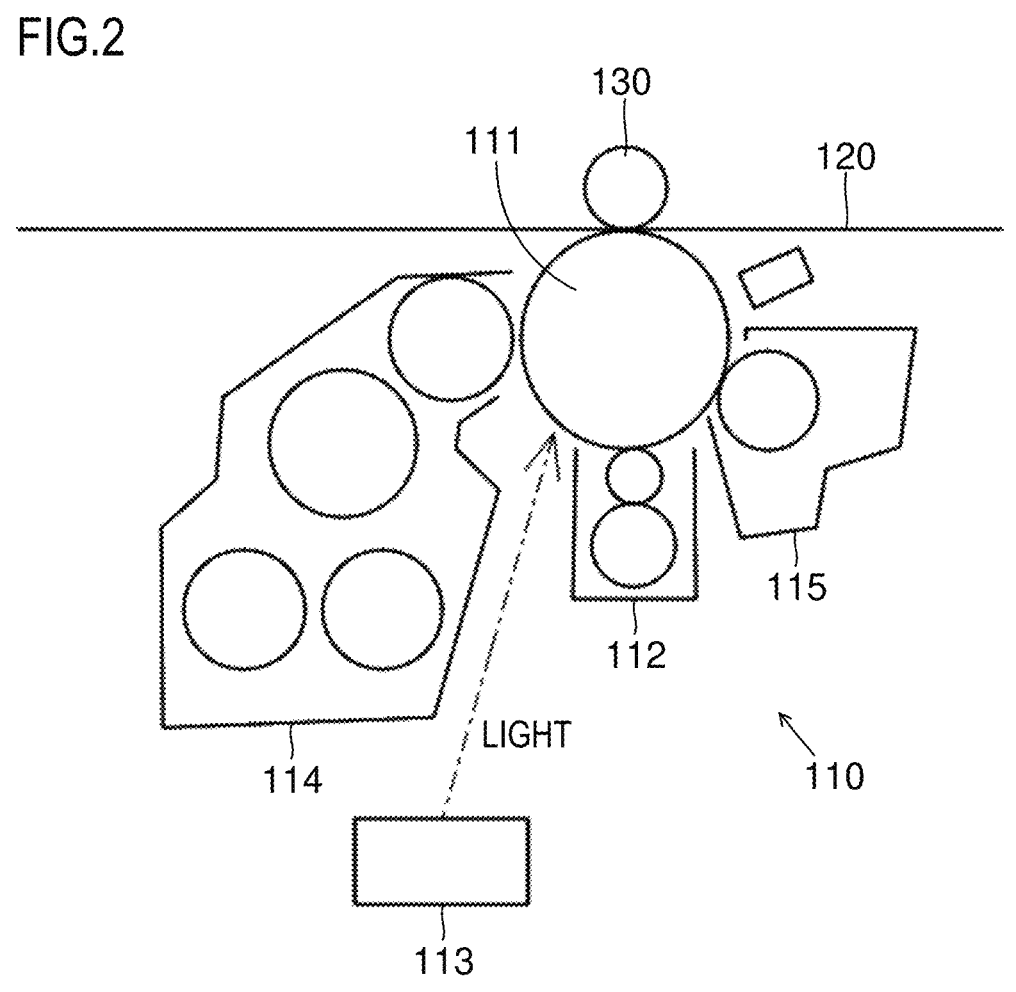

FIG. 2 shows the details of the image forming portion 110. The image forming portion 110 includes a photosensitive drum 111. The photosensitive drum 111 is rotatably supported. In the image forming portion 110, an image formed with toner is carried on the outer circumferential surface of the photosensitive drum 111. The photosensitive drum 111 rotates while carrying the toner image on its outer circumferential surface.

The image forming portion 110 includes a charging device 112, an exposure device 113, a development device 114, and a cleaning device 115. During image formation on the image forming portion 110, the photosensitive drum 111 rotates. The charging device 112 electrostatically charges the outer circumferential surface of the photosensitive drum 111. The exposure device 113 exposes the outer circumferential surface of the photosensitive drum 111 to light and forms an electrostatic latent image on the outer circumferential surface of the photosensitive drum 111. The development device 114 supplies toner to the outer circumferential surface of the photosensitive drum 111 and develops the electrostatic latent image into a toner image. Note that the toner image on the outer circumferential surface of the photosensitive drum 111 is primarily transferred to an intermediate transfer belt 120, which will be described later. The cleaning device 115 eliminates residual toner which is left on the outer circumferential surface of the photosensitive drum 111 without being transferred to the intermediate transfer belt 120.

As shown in FIG. 1, the image forming apparatus 1000 includes the intermediate transfer belt 120. The intermediate transfer belt 120 is an endless belt. The intermediate transfer belt 120 is rotatably supported. The intermediate transfer belt 120 is stretched tense around a plurality of tension rollers.

One of the plurality of tension rollers is coupled to a belt motor (not shown). In the following description, the tension roller coupled to the belt motor is referred to as a drive roller. In FIG. 1, of the plurality of tension rollers, the drive roller is identified by the reference number 121 and the other tension rollers are assigned no reference signs. The intermediate transfer belt 120 rotates by following the drive roller 121 as this rotates. The other tension rollers rotate by following the intermediate transfer belt 120.

The image forming apparatus 1000 includes a primary transfer roller 130. Four primary transfer rollers 130 are provided. The primary transfer rollers 130 are allotted one to each of the colors of cyan, magenta, yellow, and black. The primary transfer rollers 130 are disposed at the inner circumferential side of the intermediate transfer belt 120. The primary transfer rollers 130 face the photosensitive drums 111 carrying the images of the corresponding colors across the intermediate transfer belt 120. The primary transfer rollers 130 are kept in pressed contact, across the intermediate transfer belt 120, with the photosensitive drums 111 carrying the images of the corresponding colors.

The image forming apparatus 1000 includes a secondary transfer roller 140. The secondary transfer roller 140 is kept in pressed contact with the outer circumferential surface of the intermediate transfer belt 120 at the transfer position P1. The secondary transfer roller 140 grips the intermediate transfer belt 120 against the drive roller 121 to form a transfer nip with the outer circumferential surface of the intermediate transfer belt 120. Thus, the transfer nip is formed at the transfer position P1. The main conveyance passage MP runs through the transfer nip.

In the printing job, the sheet S is conveyed toward the transfer position P1 (i.e., transfer nip). The sheet S being conveyed passes through the transfer nip.

The image forming portions 110 form the images with toner of the corresponding colors. The primary transfer rollers 130 primarily transfer the images to the outer circumferential surface of the intermediate transfer belt 120.

The intermediate transfer belt 120 rotates while carrying the images primarily transferred to its outer circumferential surface by the photosensitive drums 111. While the sheet S is passing through the transfer nip, it makes contact with the outer circumferential surface of the intermediate transfer belt 120. The secondary transfer roller 140 secondarily transfers the images to the sheet S passing through the transfer nip.

The image forming apparatus 1000 includes a fixing portion 150. The fixing portion 150 includes a heating roller and a pressing roller. The fixing portion 150 is disposed at the fixing position P2. The heating roller has a heater in it. The pressing roller is kept in pressed contact with the heating roller. In pressured contact with each other, the heating roller and the pressing roller form a fixing nip at the fixing position P2.

In the printing job, the sheet S passes across the fixing position P2. In other words, the sheet S is nipped in the fixing nip. The fixing portion 150 heats the sheet S passing across the fixing position P2. At the fixing position P2, the sheet S is pressed. By heating and pressing the sheet S, the fixing portion 150 fixes the toner image to the sheet S. The sheet S having undergone fixing is ejected to the ejection tray ET.

The image forming apparatus 1000 can perform a duplex printing job in which it prints images on both sides of the sheet S as well as a simplex printing job in which it prints an image on one side of the sheet S. For the duplex printing job, the image forming apparatus 1000 includes the duplex printing conveyance passage DP.

The duplex printing conveyance passage DP branches off the main conveyance passage MP at a branching position P3 downstream of the fixing position P2 in the main conveyance passage MP along the sheet conveyance direction. The duplex printing conveyance passage DP joins the main conveyance passage MP at a junction position P4 upstream of the transfer position P1 in the main conveyance passage MP along the sheet conveyance direction.

If a job being performed is the simplex printing job, the sheet S passes through the transfer nip only once and thus transferring is performed once to the sheet S passing through the transfer nip. After the first-time transferring, the sheet S is ejected to the ejection tray ET as it is.

If a job being performed is the duplex printing job, transferring needs to be performed once on each of the front and back sides of the sheet S, and thus the sheet S passes through the transfer nip twice. Specifically, when the sheet S passes through the transfer nip first time, transferring is performed on one side of the sheet S. After the first-time transferring, the sheet S is switched back after the trailing edge of the sheet S passes across the branching position P3 and before the sheet S is completely ejected to the ejection tray ET. Then, starting with its trailing edge, the sheet S is pulled into the duplex printing conveyance passage DP.

Subsequently, the sheet S is conveyed along the duplex printing conveyance passage DP. The sheet S in the duplex printing conveyance passage DP is then brought back to the main conveyance passage MP at the junction point P4. The sheet S brought back to the main conveyance passage MP is conveyed along the main conveyance passage MP and passes through the transfer nip again. Here, the sheet S has its front and back sides turned over as compared with when the sheet S passed through the transfer nip first time. Accordingly, when the sheet S passes through the transfer nip second time, transferring is performed on the other side, that is the side opposite from one side, of the sheet S.

Figure 3:
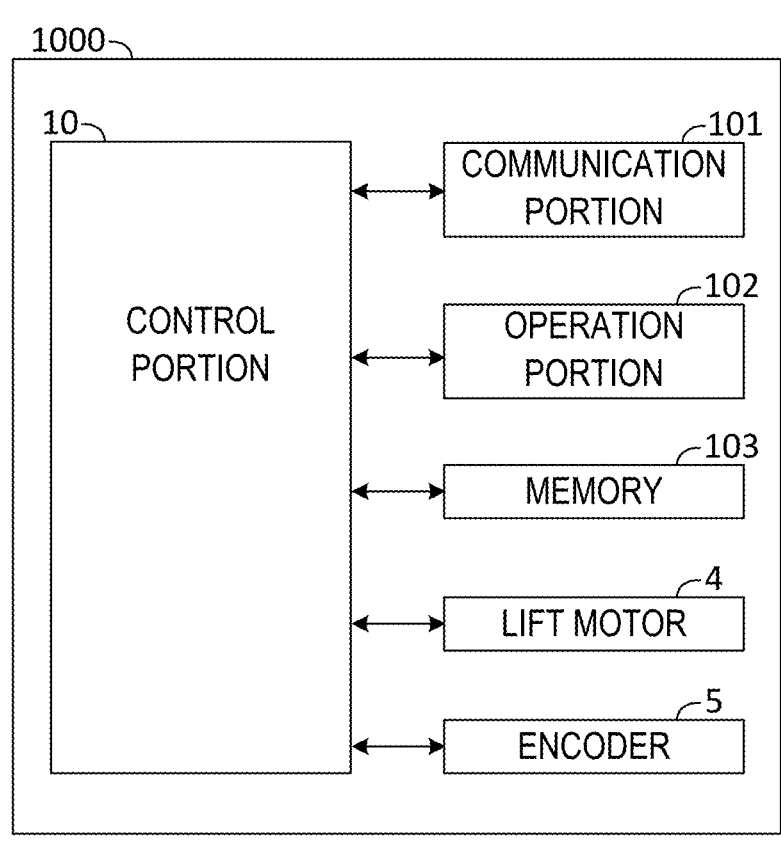
FIG. 3 is a block diagram of the image forming apparatus according to the embodiment.

As shown in FIG. 3, the image forming apparatus 1000 includes a control portion 10. The control portion 10 includes processing circuits such as a CPU and an ASIC. The control portion 10 also includes memory devices such as a ROM and a RAM. The control portion 10 controls printing jobs performed in the image forming apparatus 1000.

The control portion 10 controls the feeding of the sheet S by the sheet feeding device 100. Thus, the control portion 10 can be understood as one component of the sheet feeding device 100. In other words, the sheet feeding device 100 includes the control portion 10. Note that a feed control portion which controls the feeding of the sheet S can be provided in the sheet feeding device 100.

The image forming apparatus 1000 includes a communication portion 101. The communication portion 101 includes a communication circuit, a communication memory, and a communication connector. The communication portion 101 is connected to, so that it can communicate with, an external device via a network such as a LAN. The external device can be a user terminal. The user terminal can be a personal computer (PC), a smartphone, a tablet computer, or the like.

The communication portion 101 is connected to the control portion 10. The control portion 10 communicates with the external device by using the communication portion 101. For example, the external device transmits printing data for a printing job to the image forming apparatus 1000. The printing data includes image data to be printed in the printing job. The control portion 10 controls the printing job based on the printing data.

The image forming apparatus 1000 includes an operation portion 102. The operation portion 102 is an operation panel having a touch screen. The operation portion 102 receives settings, instructions, and the like from a user. The operation portion 102 displays various kinds of information.

The operation portion 102 is connected to the control portion 10. The control portion 10 recognizes the settings, the instructions, and the like that the operation portion 102 receives from the user. The control portion 10 controls the display by the operation portion 102.

The image forming apparatus 1000 includes a memory 103. As the memory 103, various memory devices such as a flash memory, an HDD, and an SSD can be used. The memory 103 is connected to the control portion 10. The control portion 10 writes and reads data to and from the memory 103.

Configuration of the Sheet Feeding Device: As shown in FIG. 1, the sheet feeding device 100 is disposed in a lower part of the body of the image forming apparatus 1000. The sheet feeding device 100 includes a sheet cassette CA. The sheet cassette CA is mounted in the body of the image forming apparatus 1000 (hereinafter, referred to simply as the apparatus body). The sheet cassette CA is removably mounted in the apparatus body.

The sheet cassette CA stores sheets S. In the printing job, the sheets S in the sheet cassette CA are used. As the printing job is performed, the sheets S in the sheet cassette CA are consumed and decrease. As a result of the printing job being performed, the sheets S are emptied out of the sheet cassette CA, the sheet cassette CA is pulled out of the apparatus body, is loaded with sheets S, and is then brought back into the apparatus body.

Any number of sheet cassettes CA can be mounted. A plurality of sheet cassettes CA can be mounted in the apparatus body, or the number of sheet cassettes CA that can be mounted in the apparatus body can be one. FIG. 1 illustrates as one example an image forming apparatus 1000 that has a plurality of sheet cassettes CA mounted in it.

Figure 4:
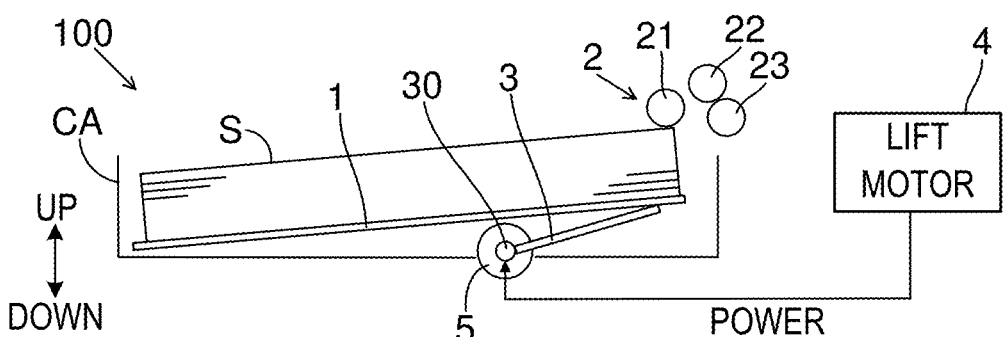
FIG. 4 is a schematic diagram showing a sheet feeding device according to the embodiment.

Now, with a focus on one sheet cassette CA, its feeding mechanism will be described with reference to FIG. 4. The sheet cassettes CA all have the same feeding mechanism, and thus no description will be given of the feeding mechanism of the other sheet cassette CA, for which the following description can be referred to.

In the following description, the direction in which the sheet feeding device 100 feeds the sheet S is referred to simply as the feeding direction. The direction perpendicular to both the top-bottom directions and the feeding direction (i.e., one horizontal direction) is referred to as the width direction. The front-rear direction of the image forming apparatus 1000 (i.e., the front-rear direction of the sheet feeding device 100) corresponds to the width direction. The sheet cassette CA is removably mounted in the width direction with respect to the apparatus body. In FIG. 4, the direction perpendicular to the plane of the figure is the width direction.

The sheet feeding device 100 includes a lift plate 1. The lift plate 1 is disposed in the sheet cassette CA. Loading the sheet cassette CA with sheets S permits the sheets S to be set on the lift plate 1. The lift plate 1 can move so as to swing, in the top-bottom directions, a downstream end part of it in the feeding direction about, as a fulcrum, an upstream end part of it in the feeding direction. In other words, the lift plate 1 is supported such that it can ascend and descend. In the following description, ascent (lifting) of the lift plate 1 means that, its downstream end part in the feeding direction moves upward, and descent (lowering) of the lift plate 1 means that its downstream end part in the feeding direction moves downward.

The sheet feeding device 100 includes a feeding portion 2. The feeding portion 2 contacts the sheet S on the lift plate 1 from above to pull and feed the sheet S out from the lift plate 1. In a printing job, a sheet S is fed out from the lift plate 1 to the main conveyance passage MP and an image is printed on the sheet S.

The feeding portion 2 includes a pick-up roller 21. The pick-up roller 21 is supported so as to be rotatable about an axis extending along the width direction. The pick-up roller 21 is disposed at a position opposite the lift plate 1 in the top-bottom directions. When the sheet S is set on the lift plate 1, the sheet S on the lift plate 1 and the pick-up roller 21 face each other in the top-bottom directions. The pick-up roller 21 contacts the topmost sheet S on the lift plate 1 from above, and rotates in this state. Thus, the sheet S is pulled and fed out from the lift plate 1.

During the printing job, starting with the topmost sheet S on the lift plate 1, the sheets S are fed one after another. When the topmost sheet S is fed out from the lift plate 1, the sheet S immediately below the sheet S so fed appears as the new topmost sheet S. That is, the sheets S on the lift plate 1 decrease. Thus, the lift plate 1 repeats ascent and suspension of ascent. The lift plate 1 ascends until it contacts the topmost sheet S on the lift plate 1, and stops ascending when the pressure of its contact with the topmost sheet S on the lift plate 1 becomes equal to a predetermined value.

In this configuration, the smaller the remaining quantity of sheets S on the lift plate 1, the larger the ascent distance of the lift plate 1. Thus, the remaining quantity of sheet S on the lift plate 1 can be recognized based on how much the lift plate 1 ascends.

When the sheet S is pulled out from the lift plate 1 by the pick-up roller 21, in some cases, the topmost sheet S (here, referred to as the first sheet S) and the sheet S immediately below the topmost sheet (here, referred to as the second sheet S) are in a state stuck together, pulled out from the sheet cassette CA. In other words, multiple feeding of sheets S occurs. Thus, the feeding portion 2 includes a separation portion. The separation portion separates the second sheet S from the first sheet S, and feeds the first sheet S only. Any configuration can be used for the separation portion. Any configuration different from the one described below can be employed for the separation portion.

The separation portion includes, for example, a feeding roller 22 and a separating roller 23. The feeding roller 22 and the separating roller 23 are supported so as to be rotatable about the axes extending along the width direction. The feeding roller 22 is coupled to a feeding motor not shown and rotates using power transmitted from the feeding motor. The separating roller 23 is kept in a pressed contact with the feeding roller 22 to form a feeding nip with the feeding roller 22. The sheet S pulled out from the lift plate 1 enters the feeding nip. The feeding roller 22 and the separating roller 23 rotate and thereby feed the sheet S having entered the feeding nip to the main conveyance passage MP.

The separation portion includes a torque limiter (not shown). The torque limiter is disposed on a rotary shaft of the separating roller 23.

When a rotary driving force transmitted from the feeding roller 22 to the separating roller 23 is equal to or less than a threshold value, the torque limiter keeps the rotary shaft of the separating roller 23 from rotating. In other words, the torque limiter does not allow the separating roller 23 to rotate. When the first and second sheets S stuck together enter the feeding nip, while the feeding roller 22 contacts the first sheet S to feed the first sheet S along the feeding direction, the separating roller 23 contacts the second sheet S without contacting the first sheet S. Thus, the rotary driving force is less likely to transmit from the feeding roller 22 to the separating roller 23. Hence, the rotary driving force transmitted from the feeding roller 22 to the separating roller 23 is equal to or less than the threshold value and the separating roller 23 does not rotate.

While the feeding roller 22 rotates, the separating roller 23 does not; and this prevents the feeding, in the feeding direction, of the second sheet S contacting the separating roller 23 without contacting the feeding roller 22. Thus, the first and second sheets S are separated from each other. In other words, multiple feeding of the first and second sheets S stuck together is prevented.

The sheet feeding device 100 includes a lifting member 3. The lifting member 3 is disposed in the sheet cassette CA. Specifically, the lifting member 3 is disposed under the lift plate 1. The lifting member 3 has, in an upstream end part of it in the feeding direction, a pivot shaft 30 of which the axial direction coincides with the width direction. The lifting member 3 can move so as to swing, in the top-bottom directions, a downstream end part of it in the feeding direction about, as a fulcrum, its upstream end part in the feeding direction (i.e., the pivot shaft 30).

The lifting member 3 brings its downstream end part in the feeding direction into contact with the bottom surface of the lift plate 1. The lifting member 3, by moving upward its downstream end part in the feeding direction about, as a fulcrum, its upstream end part in the feeding direction (i.e., the pivot shaft 30), lifts the lift plate 1. Thus, the lifting member 3 brings the sheet S on the lift plate 1 into contact with the feeding portion 2 (specifically, the pick-up roller 21). In the following description, a part of the lifting member 3 which contacts the bottom surface of the lift plate 1 (i.e., the downstream end part in the feeding direction) is referred to as a lift plate contact part.

The sheet feeding device 100 includes a lift motor 4. The lift motor 4 corresponds to a "motor." Though not shown, the lift motor 4 is coupled, via a shaft, a gear, and the like, to the pivot shaft 30 serving as a pivoting fulcrum of the lifting member 3. When the lift motor 4 is driven, the pivot shaft 30 rotates. In other words, when the lift motor 4 is driven, the lift plate contact part of the lifting member 3 moves upward. Thus, the lift motor 4 lifts the lift plate 1.

The lift motor 4 is connected to the control portion 10. The control portion 10 controls the driving of the lift motor 4. For proper control of the lift motor 4, the sheet feeding device 100 is provided with a top surface detection mechanism (not shown) which detects the position, in the top-bottom directions, of the topmost sheet S on the lift plate 1. The top surface detection mechanism outputs, to the control portion 10, a value corresponding to the contact pressure between the topmost sheet S on the lift plate 1 and the pick-up roller 21.

As the sheets S on the lift plate 1 are fed out and decrease, the control portion 10 lifts the lift plate 1. When the contact pressure between the sheet S on the lift plate 1 and the pick-up roller 21 becomes equal to the predetermined value, the control portion 10 stops lifting the lift plate 1. In other words, when the sheet S on the lift plate 1 contacts the feeding portion 2, the control portion 10 stops driving the lift motor 4. Thus, the lift plate 1 ascends as the sheets S on the lift plate 1 decrease.

Note that the lift motor 4 is disposed in the apparatus body. The sheet cassette CA is, however, removably mounted in the apparatus body. Thus, the pivot shaft 30 is divided into a part in the sheet cassette CA and a part in the apparatus body, and these two parts are coupled to each other by a coupling mechanism not shown.

Configuration of an Encoder: The sheet feeding device 100 includes an encoder 5. The encoder 5 is disposed on the pivot shaft 30 serving as a pivot fulcrum of the lifting member 3. The encoder 5 outputs a pulse signal according to the rotation of the pivot shaft 30. Note that the ascent and descent of the lift plate 1 synchronize with the rotation of the pivot shaft 30, and the ascent distance of the lift plate 1 changes depending on the remaining quantity of sheets S on the lift plate 1. Thus, the encoder 5 outputs the pulse signal according to the remaining quantity of sheets S on the lift plate 1 (i.e., the ascent distance of the lift plate 1).

The encoder 5 is connected to the control portion 10. The control portion 10 senses the ascent distance of the lift plate 1 based on the pulse signal output from the encoder 5. In other words, the control portion 10 judges the remaining quantity of sheets S on the lift plate 1 based on the pulse signal output from the encoder 5.

Figure 5:
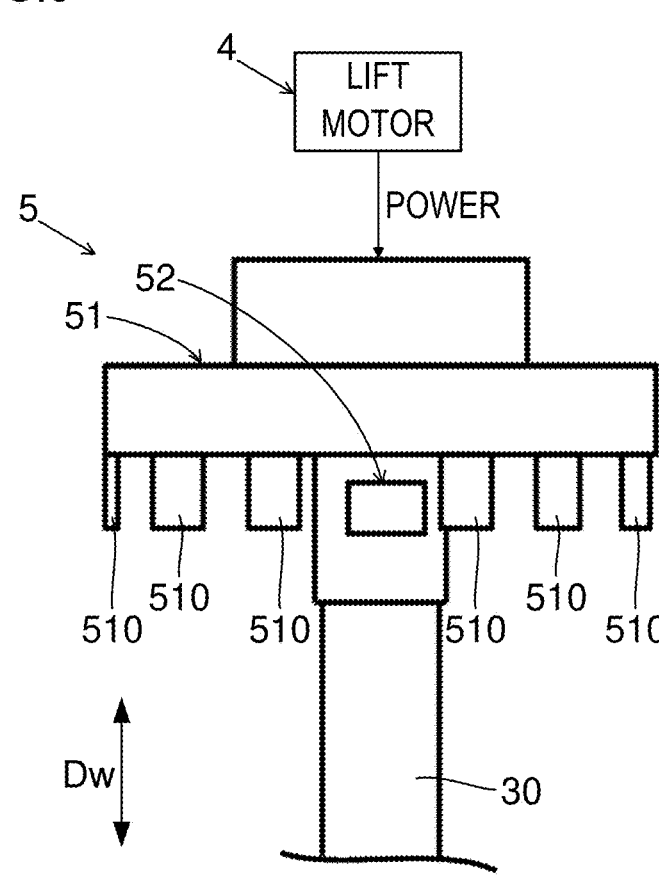
FIG. 5 is a schematic diagram showing an encoder according to the embodiment.
Figure 6:
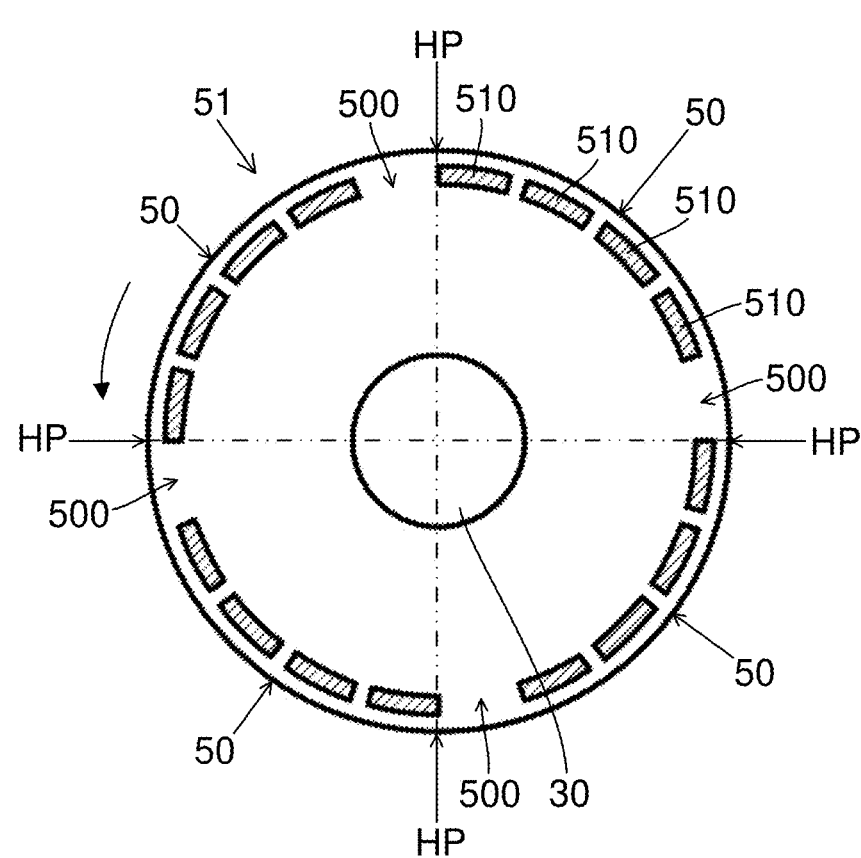
FIG. 6 is a plane view of a rotary member of the encoder in FIG. 5.
Figure 7:
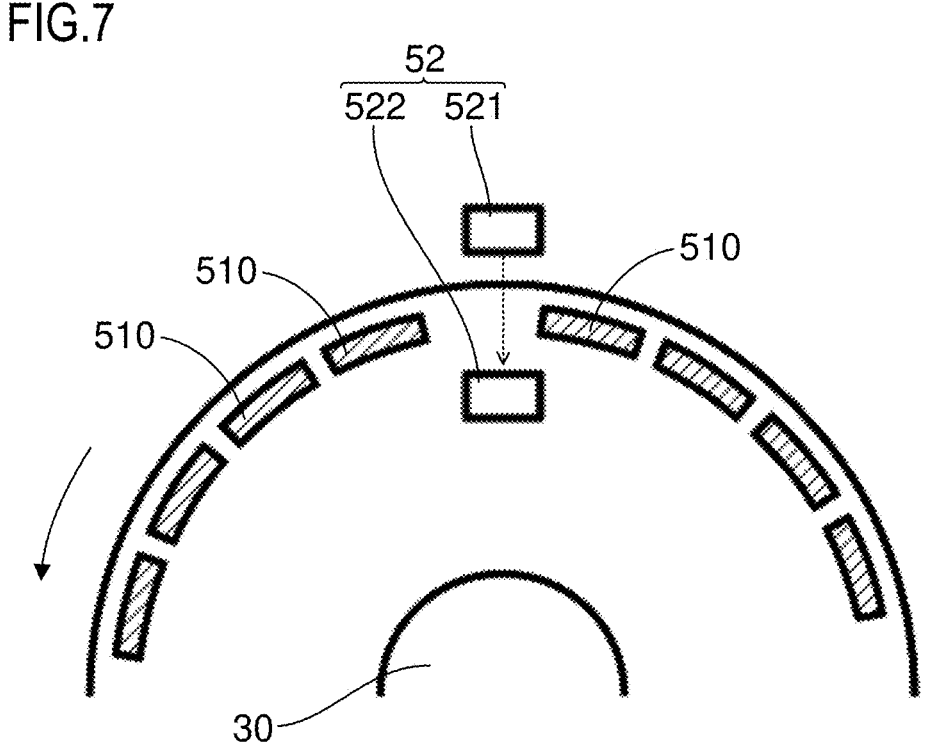
FIG. 7 is a diagram showing the positional relationship between an optical sensor and sensing segments in the encoder in FIG. 5.

The encoder 5 has a configuration as shown in FIGS. 5 to 7. In FIG. 5, the arrows indicating the width direction are given the reference sign "Dw." In FIGS. 6 and 7, the direction perpendicular to the plane of the figure is the width direction.

The encoder 5 includes a rotary member 51 and an optical sensor 52. Note that the configuration of the encoder 5 shown in FIGS. 5 to 7 is merely illustrative; any configuration can be used for the encoder 5.

The rotary member 51 is disposed on the pivot shaft 30. The rotary member 51 is in a disk shape having at its center the pivot shaft 30 as seen from the width direction (i.e., the axial direction of the pivot shaft 30). The rotary member 51 is fixed to the pivot shaft 30 so as to rotate together with the pivot shaft 30. When the pivot shaft 30 rotates, the rotary member 51 rotates by the same angle as the rotation angle of the pivot shaft 30. In the following description, the circumferential direction about the pivot shaft 30 (i.e., the rotation direction of the rotary member 51) is referred to simply as the circumferential direction.

The rotary member 51 has a plurality of sensing segments 510 arranged at intervals from each other in the circumferential direction. The sensing segments 510 corresponds to "a sensing target." In FIGS. 6 and 7, the sensing segments 510 are hatched for easy recognition. Note that in FIGS. 6 and 7, for convenience, only some sensing segments 510 are given the reference sign.

The plurality of sensing segments 510 are sensing targets of the optical sensor 52. As seen from the width direction, the plurality of sensing segments 510 are each disposed in an outer circumferential part of the rotary member 51 in the radial direction. In addition, the plurality of sensing segments 510 each protrude in the width direction.

For example, the rotary member 51 is divided equally into a plurality of parts 50 in the circumferential direction as seen from the width direction. While no limitation is meant, the rotary member 51 is divided equally into four parts 50 in the circumferential direction as seen from the width direction. In FIG. 6, for convenience, the boundaries between one part 50 and another part 50 which are adjacent to each other in the circumferential direction are indicated by two-dot chain lines.

Each of the parts 50 has the same number of, two or more (i.e., a plurality of), sensing segments 510. In each of the parts 50 the plurality of sensing segments are arranged at first intervals from each other in the circumferential direction in that part. Note that, between the parts 50 adjacent to each other in the circumferential direction, the interval between the sensing segments 510 adjacent to each other in the circumferential direction is set to a second interval (corresponding to "a predetermined interval") larger than the first interval. In other words, each of the parts 50 has a reference region 500 which has no sensing segment 510 at one side in the circumferential direction. In yet other words, the rotary member 51 has reference regions 500, across which the interval between the sensing segments 510 adjacent to each other in the circumferential direction is set to the second interval, at regular intervals in the circumferential direction.

As the lift plate contact part of the lifting member 3 moves in one direction along the circumferential direction, the lift plate 1 ascends. In other words, when the rotary member 51 rotates in one direction along the circumferential direction, the lift plate 1 ascends. Meanwhile the plurality of sensing segments 510 move along the circumferential direction.

The optical sensor 52 outputs a pulse signal. The output signal of the optical sensor 52 corresponds to the output signal (i.e., a pulse signal) of the encoder 5. The optical sensor 52 changes the level of the pulse signal.

Only one optical sensor 52 is allotted to one sheet cassette CA. The optical sensor 52 is of a transmission type and has a light emitter 521 and a light receiver 522. The light emitter 521 and the light receiver 522 are disposed so as to face each other across the movement path of the plurality of sensing segments 510 in the circumferential direction. When any of the sensing segments 510 is present in the light path between the light emitter 521 and the light receiver 522, no light from the light emitter 521 reaches the light receiver 522. On the other hand, when no sensing segment 510 is present in the light path between the light emitter 521 and the light receiver 522, the light from the light emitter 521 reaches the light receiver 522. In FIG. 7, the light path between the light emitter 521 and the light receiver 522 is indicated by a broken-line arrow.

The encoder 5 changes the level of the pulse signal between when the light from the light emitter 521 reaches the light receiver 522 and when it does not. In other words, the encoder 5 changes the level of the pulse signal between when the light path between the light emitter 521 and the light receiver 522 is not blocked by the sensing segment 510 and when it is. A signal of H level can be output from the encoder 5 when the light path between the light emitter 521 and the light receiver 522 is blocked by the sensing segment 510, or a signal of H level can be output from the encoder 5 when the light path between the light emitter 521 and the light receiver 522 is not blocked by the sensing segment 510.

For example, when the light path between the light emitter 521 and the light receiver 522 is blocked by the sensing segment 510, the signal of H level is output from the encoder 5; when the light path between the light emitter 521 and the light receiver 522 is not blocked by the sensing segment 510, the signal of L level is output from the encoder 5. When the light path between the light emitter 521 and the light receiver 522 turned from the blocked to unblocked state, the pulse signal output from the encoder 5 falls; when the light path between the light emitter 521 and the light receiver 522 turned from the unblocked to blocked state, the pulse signal output from the encoder 5 rises.

Sensing of the Remaining Quantity of Sheets: When the sheet cassette CA is mounted in the apparatus body, the control portion 10 controls the driving of the lift motor 4 to rotate the rotary member 51, and adjusts a home position of the rotary member 51 to the sensing region of the optical sensor 52 (i.e., the light path between the light emitter 521 and the light receiver 522). Meanwhile, the control portion 10, while checking the output from the optical sensor 52, rotates the lift motor 4 backward (in the direction opposite to that for lifting the lift plate 1), and controls the driving of the lift motor 4 so that the home position of the rotary member 51 coincides with the sensing region of the optical sensor 52.

The home positions are shown in FIG. 6. The boundaries between one part 50 and another part 50 adjacent to each other in the circumferential direction are the home positions of the rotary member 51 (indicated as "HP" in FIG. 6). The home positions are located in the reference region 500. Once the sheet cassette CA is mounted in the apparatus body, the sensing region of the optical sensor 52 is adjusted to one of the home positions. Specifically, when the sheet cassette CA is mounted in the apparatus body, the control portion 10 drives the lift motor 4 so that the optical sensor 52 senses the reference region 500. From the state where the optical sensor

52 is sensing the reference region 500, the control portion 10 starts to lift the lift plate 1. Note that when the sheet cassette CA is mounted in the apparatus body, the control portion 10 judges that the remaining quantity of sheets S on the lift plate 1 is full. In other words, on judging that the remaining quantity of sheets S on the lift plate 1 is full, from the state where the optical sensor 52 is sensing the reference region 500, the control portion 10 starts to lift the lift plate 1.

As the printing job is performed, the sheets S on the lift plate 1 are consumed and decrease. Accordingly, the lift motor 4 is driven and the lift plate 1 ascends. Meanwhile, the pivot shaft 30 of the lifting member 3 rotates to lift the lift plate 1, and together with the pivot shaft 30, the rotary member 51 also rotates. In FIGS. 6 and 7, the rotary member 51 rotates in the direction indicated by an arrow (counterclockwise direction).

Figure 8:
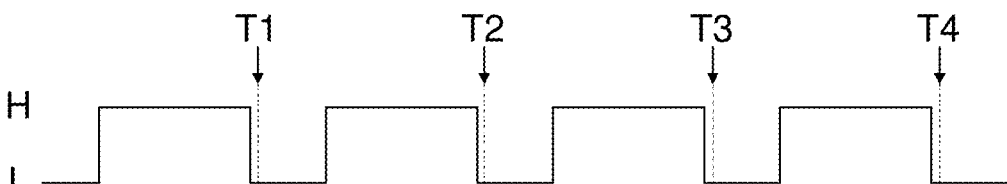
FIG. 8 is a diagram showing a pulse signal output from the encoder according to the embodiment.

As the rotary member 51 rotates, the sensing region of the optical sensor 52 alternates between the blocked and unblocked state. In other words, the encoder 5 outputs the pulse signal. An example of the pulse signal output from the encoder 5 is shown in FIG. 8.

For example, the remaining quantity of sheets S on the lift plate 1 (the ratio to the full quantity) is classified into five stages: 100%; 75%; 50%; 25%; and 0%. In this case, the rotary member 51 has four sensing segments 510 in each of the parts 50.

The control portion 10 counts the pulse signal output from the encoder 5 to sense the remaining quantity of sheets S on the lift plate 1. The control portion 10 stores the count value of the pulse signal in the memory 103 (or in a memory device in the control portion 10). The control portion 10 increments the count value when the level of the pulse signal changes from H to L. In other words, the control portion 10 increments the count value every time the pulse signal falls. In this configuration, the H level corresponds to a "first level;" L level, a "second level." For example, when the level of the pulse signal changes from H to L, the control portion 10 increments the count value of the pulse signal by one. In the example shown in FIG. 8, the count value is incremented by one at each of time points T1, T2, T3, and T4.

Based on the count value of the pulse signal, the control portion 10 recognizes the remaining quantity of sheets S on the lift plate 1. The control portion 10 makes the operation portion 102 display remaining quantity information which indicates the remaining quantity of sheets S on the lift plate 1. The operation portion 102 displays as the remaining quantity information one of 100%, 75%, 50%, 25%, and 0%.

In FIG. 8, before time point T1, the count value is "0" and thus the remaining quantity of sheets S is judged to be 100%. At time point T1, the count value is incremented by one to become "one," and thus the remaining quantity of sheets S is judged to be 75%. At time point T2, the count value is incremented by one to become "two," and thus the remaining quantity of sheets S is judged to be 50%. At time point T3, the count value is incremented by one to become "three," and thus the remaining quantity of sheets S is judged to be 25%. At time point T4, the count value is incremented by one to become "four," and thus the remaining quantity of sheets S is judged to be 0%.

After the start of the lifting of the lift plate 1, when the optical sensor 52 senses the reference region 500 the next time, the control portion 10 judges that the remaining quantity of sheets S has become equal to or less than a predetermined quantity. The time point when the optical sensor 52 senses the reference region 500 the next time is time point T4 shown in FIG. 8.

Even when the remaining quantity of sheets S is judged to be 0%, a few sheets S are left on the lift plate 1. Thus, even when the remaining quantity of sheets S is judged to be 0%, the job can be performed. For detection of the presence and absence of the sheet S on the lift plate 1, a sheet presence/absence sensor (not shown) can be used, which changes its output according to the presence and absence of the sheet S on the lift plate 1. In other words, the sheet feeding device 100 includes a sheet presence/absence sensor.

The control portion 10 judges the presence or absence of the sheet S on the lift plate 1 based on the output from the sheet presence/absence sensor. For example, when the sheets S on the lift plate 1 have run out, the control portion 10 lowers the lift plate 1 and makes the operation portion 102 display an error message indicating that the sheets S have run out. In the example shown in FIG. 8, the sheets S run out in the L level period after time point T4.

Here, the sheet feeding device 100 generates vibration. For example, when the sensing region of the optical sensor 52 changes from the blocked to unblocked state and the lift motor 4 stops being driven, ideally the level of the pulse signal changes from H to L only once. Thus, the count value is incremented only once.

Figure 9:
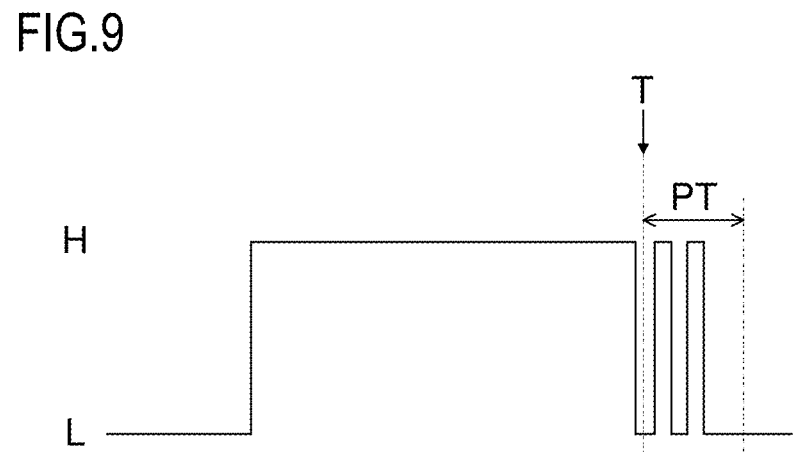

However, if as shown in FIG. 9, the lift motor 4 stops being driven at substantially the same time point T as the time point of the level change of the pulse signal from H to L, the rotary member 51 may swing in the circumferential direction under vibration. If this happens, the sensing segments 510 may pass across the sensing region of the optical sensor 52 back and forth repeatedly, and the level change of the pulse signal from H to L may be repeated in multiple times. If the level change of the pulse signal under vibration is counted, the sensing of the remaining quantity of sheets S turns out to be erroneous.

To cope with that, in the embodiment, when the lift motor 4 stops being driven, the control portion 10 does not count the pulse signal after the stop of the driving of the lift motor 4 until a predetermined period PT elapses. In the example shown in FIG. 9, the pulse signal is incremented only once. Specifically, the count value is incremented by one at time point T. On the other hand, in the predetermined period PT, the count value is not incremented in response to a level change in the pulse signal.

Thus, in the embodiment, even when the rotary member 51 swings in the circumferential direction under vibration and the level of the pulse signal changes, the count value of the pulse signal is prevented from being incorrect. In other words, erroneous sensing of the remaining quantity of sheets S on the lift plate 1 can be prevented. Further, in the embodiment, there is no need for a sensor for sensing the lower-limit position of the lift plate 1, and this helps reduce the number of components.

In the example shown in FIG. 9, the control portion 10 increments the count value of the pulse signal only once. In other words, when the lift motor 4 stops being driven at the timing of the level change of the pulse signal from H to L (i.e., at substantially the same time point as the time point of the level change of the pulse signal from H to L), even if the level of the pulse signal changes from H to L in the predetermined period PT, the control portion 10 increments the count value of the pulse signal only once. This helps prevent erroneous sensing caused by a level change in the pulse signal from H to L.

Figure 10:
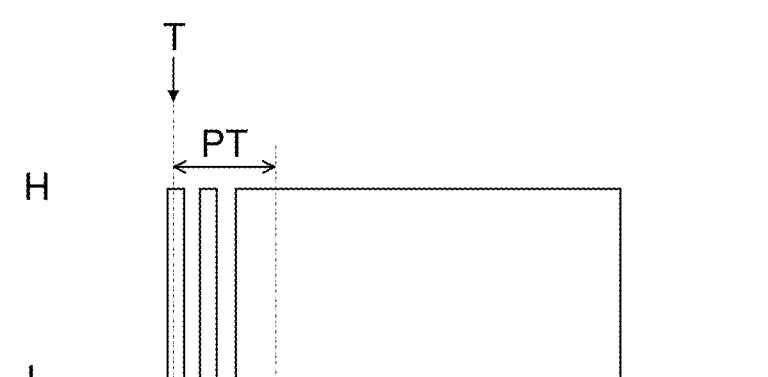
FIG. 10 is a diagram showing the relationship between the driving start time point of the lift motor (the time point of a level change from L to H) and a predetermined period according to the embodiment.

Moreover, as shown in FIG. 10, when the lift motor 4 stops being driven at substantially the same time point T as the time point of the level change of the pulse signal from L to H, the rotary member 51 may swing in the circumferential direction under vibration. If the level change of the pulse signal under vibration is counted, the sensing of the remaining quantity of sheets S turns out to be erroneous.

To prevent that, in the example shown in FIG. 10, the control portion 10 does not increment the count value of the pulse signal. In other words, when the lift motor 4 stops being driven at the timing of the level change of the pulse signal from L to H (i.e., at substantially the same time point as the time point of the level change of the pulse signal from L to H), even if the level of the pulse signal changes from H to L in the predetermined period PT, the control portion 10 does not increment the count value of the pulse signal. This helps prevent erroneous sensing caused by a level change in the pulse signal from L to H.

Furthermore, also when the lift motor 4 starts to be driven, the rotary member 51 may swing in the circumferential direction under vibration. To cope with this, when the lift motor 4 starts to be driven, the control portion 10 does not count the pulse signal after the start of the driving of the lift motor 4 until a predetermined period (for example, a period with the same length as the predetermined period PT) elapses. This helps prevent erroneous sensing at the start of driving lift motor 4.

Note that the length of the predetermined period PT can be determined experimentally. For example, the settling times of the vibration produced when the lift motor 4 is started and stopped driving are measured. Based on these times so measured, the predetermined period PT is determined.

The embodiment disclosed herein should be considered to be in every aspect illustrative and not restrictive. The scope of the present disclosure is defined not by the description of the embodiment above, but by the appended claims, and encompasses any modifications within the significance and scope equivalent to the appended claims.

What is claimed is:

1. A sheet feeding device comprising:
a lift plate on which a sheet is set;
a feeding portion that contacts the sheet on the lift plate from above to pull and feed the sheet out from the lift plate;
a lifting member that is disposed under the lift plate, the lifting member lifting the lift plate by making one end of the lifting member in a feeding direction pivot upward about another end of the lifting member in the feeding direction serving as a pivot fulcrum, the lifting member thereby bringing the sheet on the lift plate into contact with the feeding portion;
a motor that is coupled to a pivot shaft serving as a pivot fulcrum of the lifting member, the motor rotating the pivot shaft and thereby making the one end of the lifting member pivot upward;
a control portion that controls the motor, the control portion stopping driving the motor when the sheet on the lift plate contacts the feeding portion; and
an encoder that outputs a pulse signal according to rotation of the pivot shaft, wherein
the encoder includes:
a rotary member that has a plurality of sensing targets arranged at intervals from each other in a circumferential direction of the pivot shaft, the rotary member rotating together with the pivot shaft; and
an optical sensor that has a light emitter and a light receiver disposed so as to face each other across a movement path of the plurality of the sensing targets, the optical sensor changing a level of the pulse signal between when the light from the light emitter reaches the light receiver and when the light from the light emitter does not reach the light receiver,
the control portion recognizes a remaining quantity of the sheets on the lift plate based on a count value of the pulse signal,
when the motor stops being driven, the control portion thereafter does not count the pulse signal until a predetermined period elapses,
when the motor stops being driven, the rotary member swings in the circumferential direction under vibration generated in the sheet feeding device,
when the level of the pulse signal changes from a first level to a second level, the control portion increments the count value,
when the motor stops being driven at a timing of the pulse signal changing from the first level to the second level, even if the pulse signal changes from the first level to the second level in the predetermined period, the control portion increments the count value only once, and,
when the light from the light emitter does not reach the light receiver, the pulse signal at the first level is output from the encoder, and, when the light from the light emitter reaches the light receiver, the pulse signal at the second level is output from the encoder.

2. The sheet feeding device according to claim 1, wherein when the motor stops being driven at the timing of the change of the pulse signal from the second level to the first level, even if the pulse signal changes from the first level to the second level in the predetermined period, the control portion does not increment the count value.

3. The sheet feeding device according to claim 1, wherein, when the motor starts to be driven, the rotary member swings in the circumferential direction under vibration generated in the sheet feeding device, and
when the motor starts to be driven, the control portion thereafter does not count the pulse signal until a period having a length equal to a length of the predetermined period elapses.

4. The sheet feeding device according to claim 1, wherein the rotary member has reference regions, across which the interval between the sensing targets adjacent to each other in the circumferential direction is set to a predetermined interval, at regular intervals in the circumferential direction,
on judging that the remaining quantity of the sheet on the lift plate is full, from the state where the optical sensor is sensing the reference region, the control portion starts to lift the lift plate, and
after starting to lift the lift plate, when the optical sensor senses the reference region a next time, the control portion judges that the remaining quantity of the sheet has become equal to or less than a predetermined quantity.

5. An image forming apparatus comprising:
the sheet feeding device according to claim 1, wherein
the image forming apparatus prints an image on the sheet fed from the sheet feeding device.

* * * * *